Aug. 29, 1944.  W. C. HEATH  2,357,109
GRINDING MACHINE
Filed April 27, 1942  2 Sheets-Sheet 1
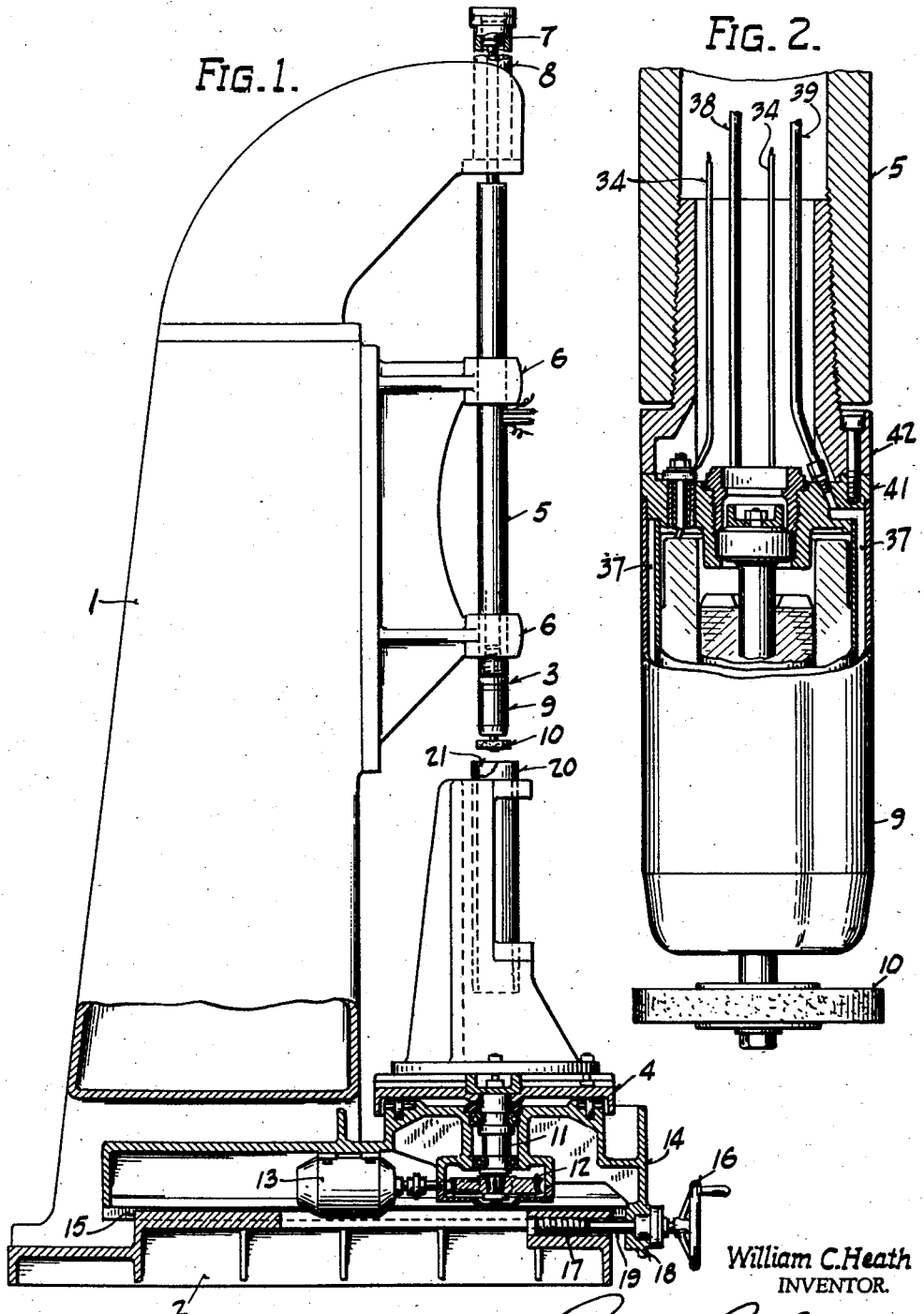
William C. Heath
INVENTOR.
BY *[signature]*
ATTORNEY.

Aug. 29, 1944.    W. C. HEATH    2,357,109
GRINDING MACHINE
Filed April 27, 1942    2 Sheets-Sheet 2
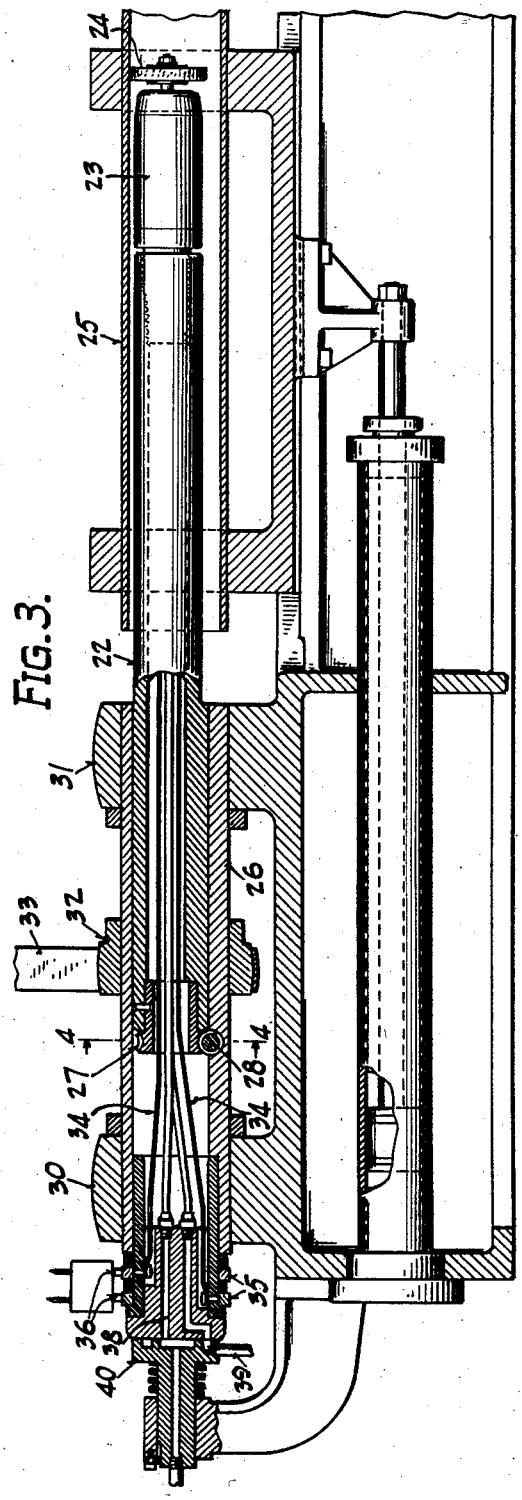
William C. Heath
INVENTOR.

Patented Aug. 29, 1944

2,357,109

UNITED STATES PATENT OFFICE 2,357,109

GRINDING MACHINE

William C. Heath, Shorewood, Wis., assignor to A. O. Smith Corporation, Milwaukee, Wis., a corporation of New York Application April 27, 1942, Serial No. 440,617

5 Claims. (Cl. 51—90)

This invention relates to a grinding machine for employment principally in the internal grinding of cylindrical bores of considerable depth.

Heretofore machines for this purpose have generally employed motors of larger diameter than the diameter of the bore to be ground and a grinding wheel has been mounted on the end of a long auxiliary shaft driven by the motor. In this type of grinding machine, the high speed of rotation of the shaft and grinding wheel has made it difficult to maintain accuracy in grinding due to whipping of the shaft and the difficulty of holding it in suitable bearings outside of the object being ground.

The principal object of the invention is to provide a grinding machine in which the accuracy of the grinding operation can be more readily maintained and which is adjustable for grinding bores of different diameters.

Another object of the invention is to provide a machine which will grind bores of considerable depth without sacrificing accuracy.

In carrying out the invention, the motor is mounted at the end of a spindle with the grinding wheel of slightly larger diameter than the motor housing mounted adjacent the outer end of the motor and directly on the motor shaft. Where the spindle is mounted for relatively slow rotation, an adjustment is provided so that the motor may be in axial alignment with the spindle or may be offset radially to a predetermined amount to provide for different diameter bores. Where the spindle is mounted for longitudinal movement only, provision is made to rotate the work piece and to adjust the bore eccentric to the axis of the motor.

The invention is illustrated in the accompanying drawings in which

Figure 1 is a side elevation of a vertical grinding machine with the rotating work table shown in section;

Fig. 2 is an enlarged side elevation partly in section of the spindle showing the motor attachment;

Fig. 3 is a side elevation of a horizontal grinding unit with parts in section showing the cooling system, electrical connections and eccentric adjustment;

Fig. 4 is a section taken on line 4—4 of Fig. 3 showing the eccentric adjustment for the grinding wheel; and Fig. 5 is an enlarged sectional view showing a modified form of motor attachment and eccentric adjustment at the end of the spindle.

The vertical grinding machine illustrated in Fig. 1 comprises in general an upright frame 1 mounted on the base 2 and supporting a grinding unit 3. A rotary work supporting table 4 is mounted on the base 2 in substantial alignment with the vertical grinding unit 3.

The grinding unit 3 comprises in general a vertically reciprocable spindle 5 mounted in bracket bearings 6 and suspended by means of a piston 7 in a hydraulic cylinder 8 at the top of the frame 1. The movement of the piston 7 up and down by means of fluid pressure in the hydraulic cylinder 8 effects vertical reciprocation of the spindle 5.

The lower end of the spindle 5 carries an electric motor 9 preferably of the same relatively small diameter as the spindle. The motor shaft carries the grinding wheel 10 adjacent the lower end of the motor, the wheel being of larger diameter than the motor housing.

The work supporting table 4 is rotated by means of a stub shaft 11 extending downwardly from its center and on the lower end of which is mounted a gear 12 meshing with a worm gear driven by the motor 13. The work table 4 and its drive including the motor 13 are carried by a laterally movable frame 14 operating in guideways 15 in the base 2. A hand wheel 16 operates a feed screw 17 threading into the base 2 to adjust the horizontal position of the frame 14, the frame having a depending lug 18 in which the shaft 19 of the hand wheel is journaled.

In operation the work 20 is positioned and secured on the work table 4 with the cylindrical bore 21 disposed vertically and beneath the grinding wheel 10. The grinding wheel 10 is moved downwardly by means of the hydraulic cylinder 8 and piston 7 until close to the upper end of the work piece 20. Then the work piece is adjusted horizontally to provide the desired grinding cut and the motor 13 is started to slowly rotate the work table and work piece. The grinding wheel 10 is slowly moved downwardly by means of the hydraulic cylinder effecting the desired internal grinding of the surface of the work piece in the bore progressively for its full depth. The amount of the cut of the grinding wheel may be adjusted to take substantially the required amount with one downward feed of the grinding wheel or to employ lighter cuts and multiple passes of the grinding wheel downwardly in the bore.

In the machine illustrated in Fig. 3 the spindle 22 which carries the motor 23 and grinding wheel 24 is mounted for slow rotation and for eccentric adjustment relative to the axis of rotation of the spindle. The work piece 25 is fixed against rotation and is mounted for horizontal reciprocation toward and away from the grinding wheel 24. In this construction the spindle 22 is mounted eccentrically in the end of the tubular shaft 26. The spindle is telescoped by the shaft for a substantial distance to provide accurate bearing surface for supporting the grinding wheel against deflection. The inner end of the spindle 22 has a gear 27 meshing with a worm 28 having a suitable adjusting head 29. The outer end of the spindle 22 along with the motor and grinding wheel are disposed on an axis laterally offset from the axis of the inner end of the spindle to provide for the lateral adjustment of the grinding wheel relative to the axis of rotation of the shaft 26 through a substantially wide range.

The shaft 26 is mounted for rotation in spaced bearings 30 and 31. The shaft is rotated by means of a pulley 32 and belt 33 from any suitable source of power such as an electric motor (not shown).

Electrical connections to the motors 9 and 23 are made by means of wires 34. In the case of motor 23 in Fig. 3, the wires 34 connect the motor to lead rings 35 on which the brushes 36 contact to provide electrical energy for the motor. The brushes 36 are connected to any suitable source of power (not shown).

The motors 9 and 23 are preferably cooled by water or other suitable fluid circulated through spaces 37 in the motor housing from an inlet conduit 38 to an outlet conduit 39. In the horizontal machine of Fig. 3 the conduits 38 and 39 extend through the spindle and to the rear end of the shaft 26 where they connect through ports with inlet and outlet chambers respectively in the stationary member 40. Any other suitable means may be provided for supplying cooling medium to the motor.

The motor for driving the grinding wheel may be mounted on the end of the spindle in any suitable manner. In the construction illustrated in Fig. 2 the motor housing 41 is bolted to an end shank 42 which in turn is threaded into the end of the hollow spindle 5 or 22.

In the modification illustrated in Fig. 5, the motor housing 41 is secured eccentrically in a tubular support 43 which in turn is eccentrically mounted in the end of the spindle. A ring 44 is threaded into the end of the spindle and bears against the tubular support 43 to secure it against the shoulder 45 in the spindle and secure the support in place. The support 43 is rotated relative to the spindle for adjusting the lateral position of the grinding wheel by means of the gear 46 and worm 47 similar to those previously described.

By mounting the motor at the end of the spindle, thereby eliminating the high speed rotation of the spindle, the invention avoids inaccuracies of grinding caused by vibration and whipping of long high speed rotary shafts. It is possible to mount the spindle vertically or horizontally and to give it and the work piece various types of movement. For instance, the spindle 22 of the machine illustrated in Fig. 3 may be mounted on a reciprocating frame to provide for the longitudinal movement of the grinding wheel relative to the work piece 25.

Various embodiments may be made within the scope of the accompanying claims.

I claim:

1. In a grinding machine, a tubular rotary sleeve having an inside bore eccentric to the outside, bearings for supporting said sleeve for rotation, a motor spindle secured in said sleeve for rotation therewith and independently thereof, an electric motor carried by said spindle eccentrically thereof and having a grinding wheel mounted on the motor shaft, a gear element on said spindle inside said sleeve, a worm gear meshing with said element with its shaft bearing in the wall of said sleeve, and means at the end of said worm gear shaft exposed externally of said sleeve for turning the same to adjust the eccentricity of the motor and the bearing support for said sleeve.

2. In a grinding machine, a tubular rotary sleeve having an inside bore eccentric to the outside, bearings for supporting said sleeve for rotation, a motor spindle secured in said sleeve for rotation therewith and independently thereof, an electric motor carried by said spindle eccentrically thereof and having a grinding wheel mounted on the motor shaft, a gear element on said spindle inside said sleeve, a worm gear meshing with said element with its shaft bearing in the wall of said sleeve, and means at the end of said worm gear shaft exposed externally of said sleeve for turning the same to adjust the eccentricity of the motor and the bearing support for said sleeve, said spindle being hollow and containing wiring for conducting current to said motor and passages for conducting a cooling medium to said motor.

3. In a grinding machine, a tubular rotary sleeve having an inside bore eccentric to the outside, bearings for supporting said sleeve for rotation, a spindle telescoped by said sleeve and held thereby against lateral pressure, said spindle being rotatable with said sleeve during grinding operations, an electric motor mounted at the outer end of said spindle and having its shaft extending parallel to the axis of the spindle, a grinding wheel secured to the motor shaft, the axis of said grinding wheel being off-center relative to the axis of said sleeve, and means for adjusting the relative amount of off-center of said axes.

4. In a grinding machine, a tubular rotary sleeve having an inside bore eccentric to the outside, bearings for supporting said sleeve for rotation, a spindle telescoped by said sleeve and held thereby against lateral pressure, said spindle being rotatable with said sleeve during grinding operations, an electric motor mounted at the outer end of said spindle and having its shaft extending parallel to the axis of the spindle, a grinding wheel secured to the motor shaft, the axis of said grinding wheel being off-center relative to the axis of said sleeve, and means for rotating said spindle relative to said sleeve to adjust the relative amount of off-center of said axes.

5. In a grinding machine, a tubular rotary sleeve having an inside bore eccentric to the outside, bearings for supporting said sleeve for rotation, a motor spindle secured in said sleeve for rotation therewith and independently thereof, an electric motor carried by said spindle and having a grinding wheel mounted on the motor shaft eccentrically of the bore of said sleeve, a gear element on said spindle inside said sleeve, a worm gear meshing with said element with its shaft bearing in the wall of said sleeve, and means at the end of said worm gear shaft exposed externally of said sleeve for turning the same to adjust the eccentricity of the motor and the bearing support for said sleeve.

WILLIAM C. HEATH.